(12) United States Patent
Rhodes et al.

(10) Patent No.: US 8,184,068 B1
(45) Date of Patent: May 22, 2012

(54) PROCESSING OBJECTS FOR SEPARATE EYE DISPLAYS

(75) Inventors: Charles C. Rhodes, Los Altos, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/215,323

(22) Filed: Aug. 23, 2011

Related U.S. Application Data

(63) Continuation of application No. 12/941,713, filed on Nov. 8, 2010, now abandoned.

(51) Int. Cl.
*G09G 5/00* (2006.01)

(52) U.S. Cl. .............................. 345/7; 348/115; 359/630

(58) Field of Classification Search .................. 345/7–9; 348/42, 43, 51, 53, 115; 359/462, 464, 466, 359/480, 630; 382/254, 255
See application file for complete search history.

(56) References Cited

U.S. PATENT DOCUMENTS

| | | | | |
|---|---|---|---|---|
| 4,567,513 | A * | 1/1986 | Imsand | |
| 5,343,313 | A * | 8/1994 | Fergason | |
| 5,886,822 | A * | 3/1999 | Spitzer | 359/630 |
| 6,073,443 | A * | 6/2000 | Okada et al. | |
| 6,201,517 | B1 * | 3/2001 | Sato | 345/7 |
| 6,384,982 | B1 * | 5/2002 | Spitzer | 359/630 |
| 6,496,598 | B1 * | 12/2002 | Harman | |
| 7,319,437 | B2 * | 1/2008 | Yamamoto | 345/8 |
| 7,420,282 | B2 * | 9/2008 | Iwane et al. | |
| 7,604,348 | B2 * | 10/2009 | Jacobs et al. | |
| 7,791,809 | B2 * | 9/2010 | Filipovich et al. | |
| 2003/0038922 | A1 * | 2/2003 | Ferrell | 352/85 |
| 2003/0063383 | A1 * | 4/2003 | Costales | 359/464 |
| 2005/0190258 | A1 * | 9/2005 | Siegel et al. | 348/47 |
| 2006/0038880 | A1 * | 2/2006 | Starkweather et al. | 348/51 |
| 2006/0232665 | A1 * | 10/2006 | Schowengerdt et al. | 348/51 |
| 2007/0030211 | A1 * | 2/2007 | McGlone et al. | 345/7 |
| 2009/0232351 | A1 * | 9/2009 | Kagitani et al. | |

* cited by examiner

*Primary Examiner* — Regina Liang
(74) *Attorney, Agent, or Firm* — McDonnell Boehnen Hulbert & Berghoff LLP

(57) ABSTRACT

Disclosed are embodiments for methods and devices for displaying images. In some example embodiments, methods may include receiving data corresponding to an image with a processor. The image data may include at least one image object. In additional example embodiments, each image object may be assigned to either a foreground image set or a background image set using a processor, for example. An example embodiment may also include rendering a first display image based on at least the foreground image set. The first display image may include the objects assigned to the foreground image set. Additionally, the objects assigned to the foreground image set may be in focus in the first display image. Embodiments may also include rendering a second display image based on at least the background image set. The second display image may include the objects assigned to the background image set. Additionally, the objects assigned to the background image set may be in focus in the second display image.

20 Claims, 8 Drawing Sheets

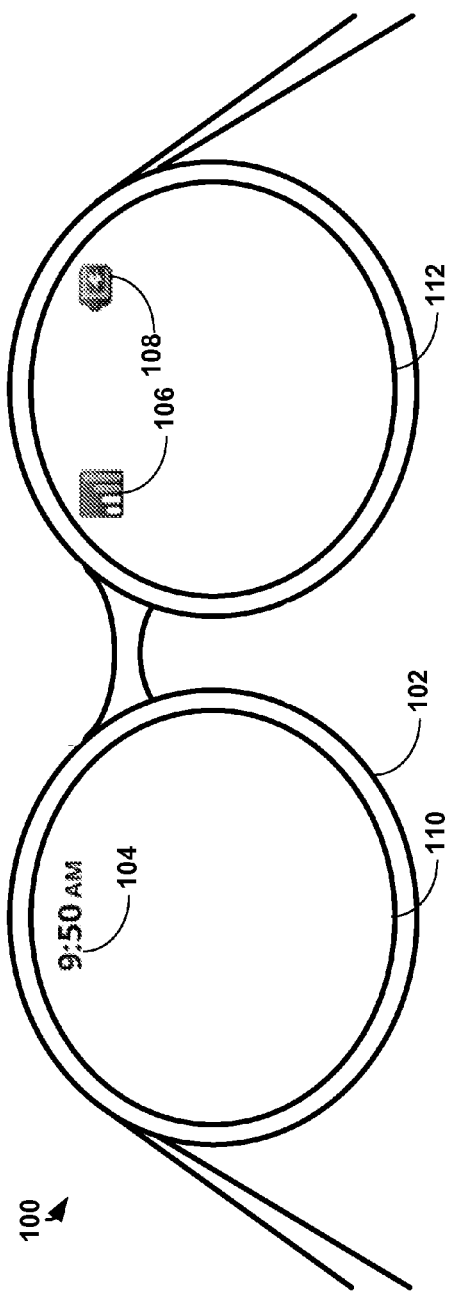
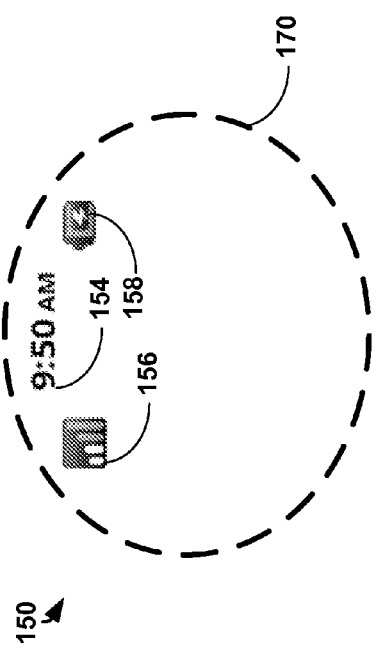

US 8,184,068 B1

PROCESSING OBJECTS FOR SEPARATE EYE DISPLAYS

CROSS REFERENCE TO RELATED APPLICATION

The present application claims priority to U.S. patent application Ser. No. 12/941,713, filed on Nov. 8, 2010, the entire contents of which are herein incorporated by reference.

BACKGROUND

Unless otherwise indicated herein, the materials described in this section are not prior art to the claims in this application and are not admitted to be prior art by inclusion in this section.

Various technologies can be utilized to display information to a user of a system. Some systems for displaying information may utilize "heads-up" displays. A heads-up display is typically positioned near the user's eyes to allow the user to view displayed images or information with little or no head movement. To generate the images on the display, a computer processing system may be used. Such heads-up displays have a variety of applications, such as aviation information systems, vehicle navigation systems, and video games.

One type of heads-up display is a head-mounted display. A head-mounted display can be incorporated into a pair of glasses or a helmet that the user can wear. The display is typically calibrated and aligned in the user's field of view, as misalignment may cause double vision and eyestrain. A misalignment may be a shift in the x-direction, y-direction, or a combination of the x- and y-directions. The misalignment may also be an angular misalignment, in which one displayed image is rotated with respect to the other displayed image. The calibration to correct misalignment of the images may be user specific and each user may need a unique calibration to fit his or her vision.

SUMMARY

Disclosed are embodiments for methods and devices for displaying images. In an example embodiment, a method may include a processor receiving data corresponding to an image. In the example embodiment, each object in the image may be assigned to either a first or a second image set, such as a foreground image set or a background image set.

An example embodiment may also include rendering a first display image based on the objects assigned to the foreground image set. The objects assigned to the foreground image set may be in focus (or substantially in focus) in the first display image. Similarly, a second display image is rendered based on the objects assigned to the background image set. The objects assigned to the background image set may be in focus (or substantially in focus) in the second display image. The first display image may correspond to a left eye display image and the second display image may correspond to a right eye display image.

Additional example embodiments may include transmitting the first display image and the second display image to at least one display processor. Various embodiments may include displaying the first display image on a first display and displaying the second display image on a second display.

Further embodiments may include the first display image having the objects assigned to the background image set out of focus. Additionally, some embodiments include rendering the second display image having objects assigned to the foreground image set out of focus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the figures:

FIG. 1A shows an example embodiment of a system for displaying images;

FIG. 1B shows another example embodiment of a system for displaying images;

Figure 2A:
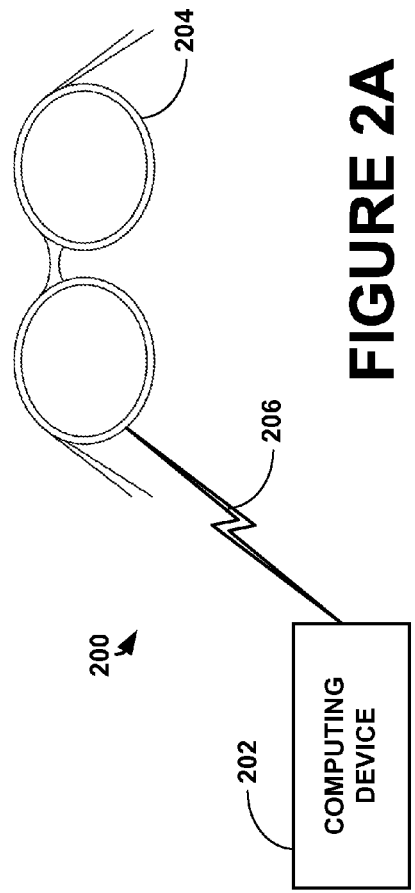
FIG. 2A is an example apparatus for displaying images to a user.

all arranged in accordance with at least some embodiments of the present disclosure.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to displaying images in a heads-up display. In some example embodiments, the system includes a head mounted display apparatus and processing apparatus. The head mounted display may be configured with two separate displays, one configured in front, near, or about each eye as further discussed herein.

1. System for Display of Objects on Near Eye Displays Overview

FIG. 1A shows an example embodiment of a system for displaying images. In one system 100, a display device 104, such as a head mounted display in this example, is coupled to a computing device 102 with a communication link 106. The display device 104 may contain hardware to enable a wireless communication link. The computing device 102 may be a desktop computer, a television device, or a portable electronic device such as a laptop computer or cellular phone, for example. The computing device 102 is not meant to be limiting, as any device that may need a display could substitute for computing device 102. The communication link 106 may transfer image or textual data to the display device 104 or may transfer unprocessed data. The display unit 104 may contain a processor to compute the displayed images based on received data.

Additionally, the communication link 106 connecting the computing device 102 with the display 104 may be one of many communication technologies. For example, the communication link 106 may be a wired link via a serial bus such as USB, or a parallel bus. A wired connection may be a proprietary connection as well. The communication link 106 may also be a wireless connection, such as Bluetooth, IEEE 802.11 (IEEE 802.11 may refer to IEEE 802.11-2007, IEEE 802.11n-2009, or any other IEEE 802.11 revision), or other wireless based communication link.

FIG. 1B shows another example embodiment of a system for displaying images. In the system 150, a computing device 152 is coupled to a network 156 via a first communication link 154. The network 156 may be coupled to a display device 160 via a second communication link 158. The display device 160 may contain hardware to enable a wireless communication link. The first communication link 154 may transfer image data to the network 156 or may transfer unprocessed data. The display device 160 may contain a processor to compute the displayed images based on received data.

In some embodiments, the first communication link 154 may be provided by the internet. This may be a wired connection via coaxial cable, ethernet cable, or telephone cable. The first communication link 154 may also be wireless, operating on an 802.11 wifi protocol. In some embodiments, the network 156 may be a cellular based connection such as GSM, CDMA, UMTS, EV-DO, WiMAX, or LTE and may provide the second communication link 158. Additionally, the network 156 may provide the second communication link 158 by a different radio frequency based network, and may be any communication link of sufficient bandwidth to transfer images or data, for example.

The systems 100 or 150 receive data corresponding to an image. The data received may be a computer image file, a computer video file, an encoded video or data stream, three-dimensional rendering data, or openGL data for rendering. In some embodiments, the data may also be sent as plain text. The text could be rendered into objects or the system could translate the text into objects. To render an image, the system may write information associated with the image to a data file, for example.

A processor in the system may be configured to interpret the data and form an image. Additionally, the processor may be configured to identify at least one object within the image data and render images. In embodiments where a data stream is received, the processor may be configured to determine objects from the received data. Further details of the processor operation are described herein.

2. Example Embodiments of Display of Objects on Near Eye Displays

FIG. 2A is an example apparatus for displaying images to a user that could be utilized in the systems of FIGS. 1A and 1B. In an example embodiment, a heads-up display unit 200 may comprise a pair of glasses 202 with a left and a right eye lens that are each configured to be positioned in approximately the same plane so that the left an the right eye lens are positioned approximately side-by-side. The example heads-up display 200 can be coupled to a phone (e.g., wired or wireless), and the phone can be configured to relay data to a user via the heads-up display 200.

The glasses 202 are merely an example; any type of near eye display unit containing a display apparatus may be used, such as a helmet, contact lens, goggles, and glasses. Further example embodiments may include a display comprising a liquid crystal display (LCD), light emitting diodes (LEDs), a molded polymer display, or a free space reflection display, or other means of image generation, for example. Additional example embodiments may include a waveguide in the display for generating images in front of the user's eyes. The display means and display housing are not meant to limit the scope of the present application.

In some embodiments, such as those with glasses or goggles, the display 200 may be separated from a user's eyes by approximately 1.5 cm. In other embodiments, such as with contact lenses, the separation distance may be decreased. In some embodiments, there may be two displays, one for each eye, and in this example, it may be desirable for each display to only be visible by one eye.

Figure 6:
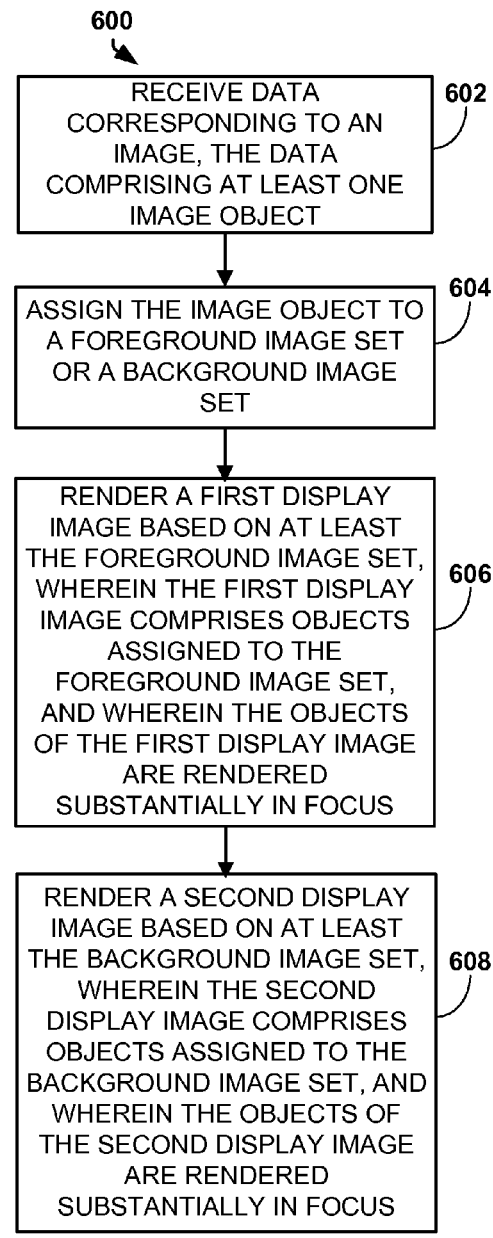
FIG. 6 is an example block diagram of a method to display images to a user.

Various embodiments may classify objects in a displayed image into two different object sets as described in more detail in the discussion of FIG. 6. Briefly, a three dimensional scene may be rendered with a clipping plane to determine a transition threshold from foreground to background. A position of the clipping plane classifies object as either foreground objects or background objects. A clipping plane may be thought of as a threshold distance for the separation of the foreground region and background region. The terms foreground and background are merely example classifications. The image sets may also be considered a left eye image set and a right eye image set or other classification designations.

Objects that are a part of the foreground image set can be rendered in focus as part of the first display image. Similarly, a second display image may be rendered with the background image set objects in focus, as discussed in more detail with regard to FIGS. 3 and 4.

In an example embodiment of FIG. 2A, clock 204 showing the current time "9:50 am", signal strength meter 206, and battery status 208 are objects that may be associated with a mobile phone, which relays data associated with these objects to the heads-up display 200, for example. In the example of FIG. 2A, the clock 204 showing the current time may be considered a background object and a signal strength meter 206 and a battery status 208 may be considered foreground objects.

After the objects have been classified as either as foreground or background objects, two different images can be rendered, one for a left display 210 and one for a right display 212. All the background objects can be displayed to one display, such as the left display 110, while the foreground objects can be displayed to the right display 212.

Figure 2B:
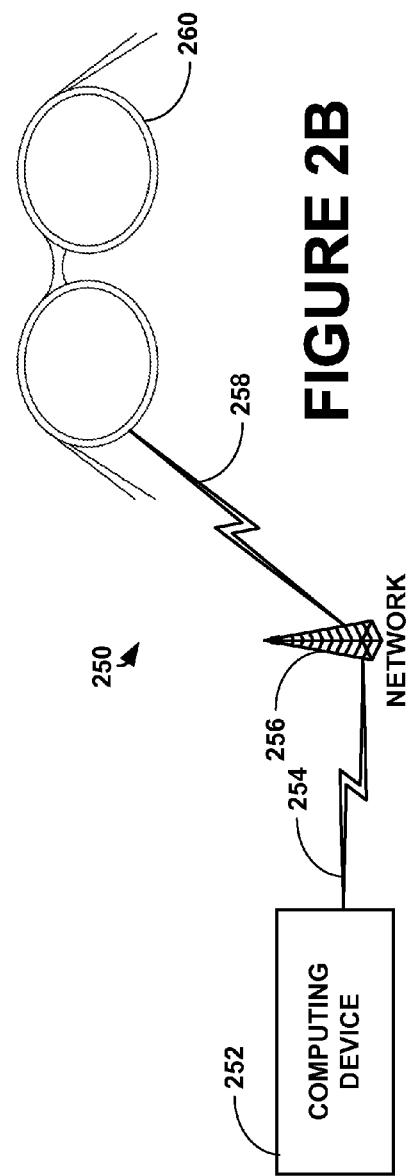
FIG. 2B shows another example embodiment of a system for displaying images.

By way of example, FIG. 2B is an example field of vision for a user. A user wearing the glasses 202 of the heads-up display 200 may have a field of vision 250, as depicted in FIG. 2B, for example. To a user wearing the glasses 202, an apparent field of vision 270 may comprise all objects rendered on the left display 210 and on the right display 212. For example, a user may be able to see a clock 254, a signal status 256, and a battery status 258.

Both the foreground objects 256 and 258, and the background object 254 may be present in the field of vision 270. A user wearing the glasses 202 may be able to see the full set of objects within the field of view 270. The user wearing the glasses 202 may not know whether an object is assigned to the foreground object set or background object set since all objects may appear in the field of vision 270. An end user may choose to have foreground objects placed in front of his or her dominate eye for viewing ease.

By placing objects in front of one eye, a constraint for calibration or accurate calibration to align the images in each display may be lowered or removed. The user's brain may visually interpolate the displayed images. A user may be able to see the objects in his or her field of vision.

Figure 3:
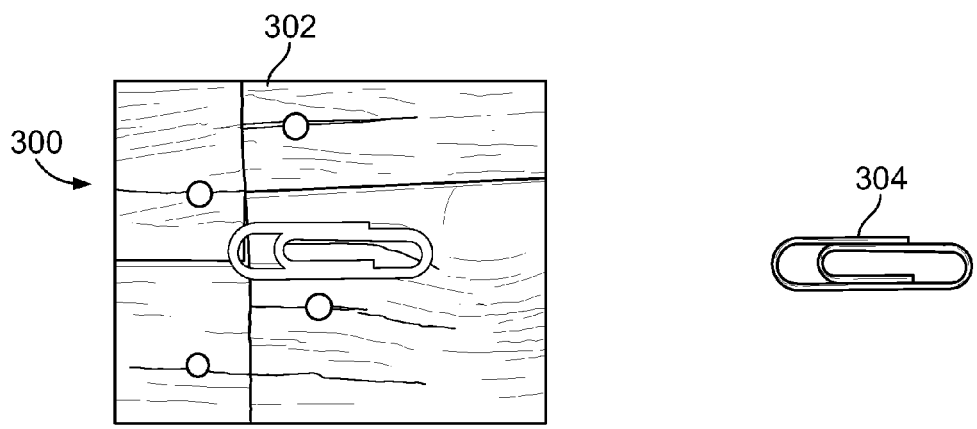
FIG. 3 is an alternate embodiment for a method of displaying of images.

FIG. 3 is an alternate embodiment for a method of displaying of images. Image 300 comprises a foreground 304 and background image 302 to be presented in the displays. In this embodiment, the background image 302 has a hole or space provided approximately equal in size and shape to the foreground image 304. The foreground image 304 may be rendered alone. The hole in background image 302 may not be the same size and shape as the foreground image 304, and the hole may not be aligned with the foreground image 304. In some embodiments, the hole has edges blurred or feathered so that the edges are not sharp and blend in with the background image 302.

When the background image 302 is presented to one eye and the foreground image 304 is presented to the other eye, the brain may determine the sharp foreground image 304 in front of (or substantially in front of) the background image 302. The brain may fill in the hole in the background image 302 with the foreground image 304. A user may be able to see both the foreground image 304 and the background image 302 in focus.

Figure 4:
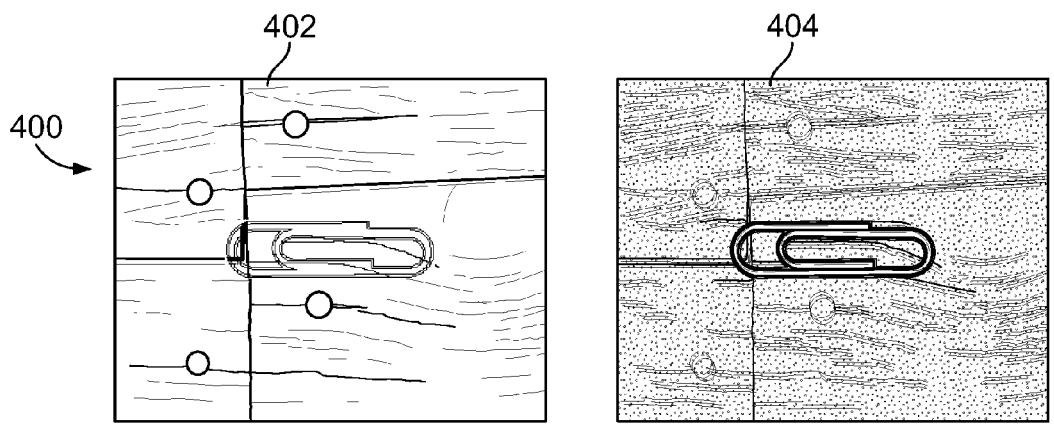
FIG. 4 is an alternate embodiment for a method of displaying images.

FIG. 4 is an alternate embodiment for a method of displaying images. Image 400 is an embodiment similar to image 300. A background image 402 contains a background object (e.g., boards) rendered in focus and may contain a blurred region in an area approximately equal in size and shape to a foreground object (e.g., paper clip). The foreground image 404 can contain a foreground object (paper clip) rendered in focus and a blurred portion of the image corresponding to the background object (boards). Features that may be presented crisply in one image may be presented blurry in the corresponding image, for example. In some embodiments, the images to be blurred are first presented as an in-focus image and later blurred by a filter on a graphics processor before the in-focus objects are rendered.

When the background image 402 is presented to one eye, and the foreground image 404 is presented to the other eye, the brain may superimpose the in-focus objects for the blurry objects. The superimposing may result in a user seeing in-focus foreground objects (paper clip) from the foreground image 404 in front of in-focus background objects (boards) from the background image 402. The brain may compensate for the blurred regions.

Using either of the embodiments illustrated in FIGS. 3 and 4, images may be presented to glasses of a heads-up display, such that a foreground image is presented to a left display of the glasses and the background image is presented to a right display of the glasses, for example.

Figure 5A:
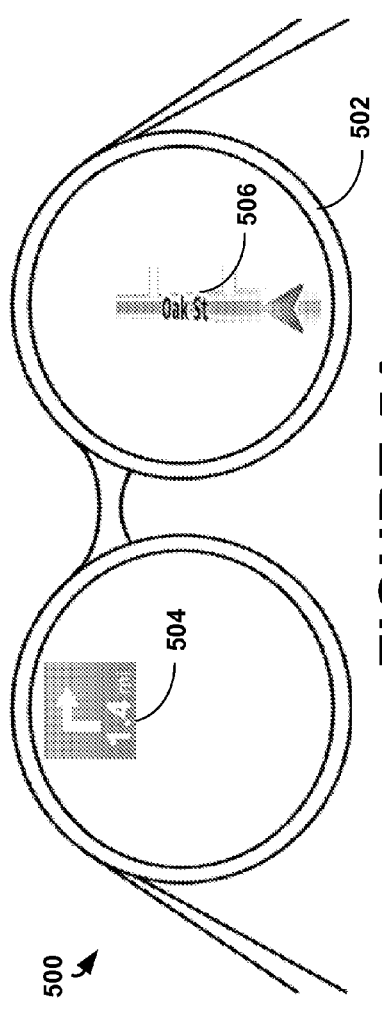
FIG. 5A is an embodiment displaying navigation images.

FIG. 5A is an embodiment displaying navigation images. In an example embodiment, a display apparatus 500 may be coupled to a global positioning system device (GPS), mobile device, or computer for navigational purposes. Each display on a headset 502 may display different information about the navigational instructions. For example, a turn indicator 504 may notify a driver to turn in 1.4 miles and a map icon 506 may show a current driving path. In some embodiments, a user of the display apparatus 500 may customize what graphics are shown and where the graphics are positioned. In additional embodiments, the display apparatus 500 may contain different sensors to couple information to a mobile device, or computer. For example, sensors may include radio receivers, like a GPS receiver, compasses, accelerometers, and gyroscopes. The sensors may provide location information, head orientation information, and/or movement information.

In one embodiment, the display apparatus 500 may be coupled to a mobile device. The mobile device may be configured to allow configuration of the display apparatus 500. The mobile device may have a menu system to configure graphics, and the mobile device can render images for display on the display apparatus 500 based upon a user's configuration. The configuration may be, but is not limited to, the position of objects, the color of objects, the size of objects, and the presence of objects. For example, a user may not wish to see the map icon 506, and thus, only the turn indicator 504 may be displayed. This embodiment is not limited to driving and may be useful in any situation requiring navigation, such as boating, skiing, walking, jogging, flying, or biking.

Figure 5B:
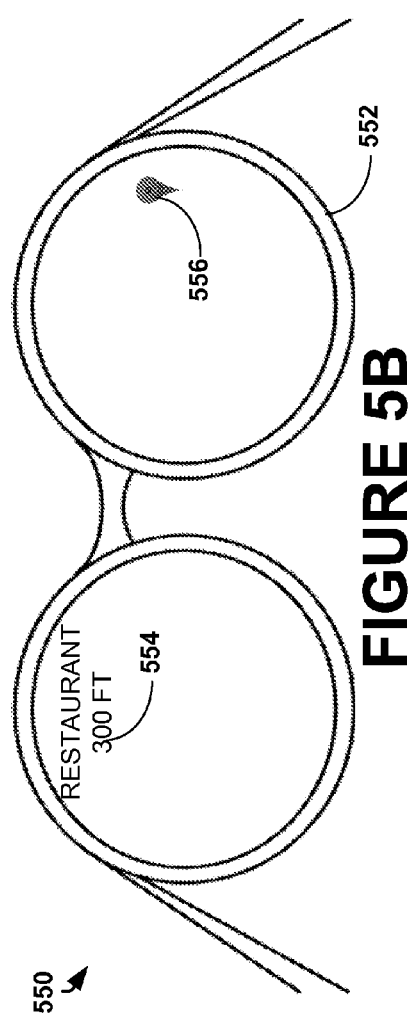
FIG. 5B is an embodiment of displaying point of interest images.

FIG. 5B is an embodiment of displaying point of interest images. In an example embodiment, a display apparatus 550 may be coupled to a GPS, mobile device, or computer for point of interest purposes. Each display on a headset 552 may display different information about a point of interest. For example, a distance indicator 554 may notify a user that the user is located 300 feet from a restaurant and a point of interest 556 places a pinpoint on the location of a restaurant. In some embodiments, a user of the display apparatus 50 may customize what objects are shown.

In additional embodiments, the display apparatus 550 may contain sensors; the sensors may include radio receivers, like a GPS receiver, compasses, accelerometers, and gyroscopes. The sensors may provide location information, head orientation information, and/or movement information. For example, if a user wearing the display apparatus 550 turns or moves his or her head to the right, the point of interest 556 may move closer to the center, tracking the location of the restaurant. Display apparatus 550 may use more information than a GPS coordinate, such as for example, the direction a user is looking (heading) as well as the tilt of a user's head. Additional sensors for these measurements may be placed in the display apparatus 550.

Figure 5C:
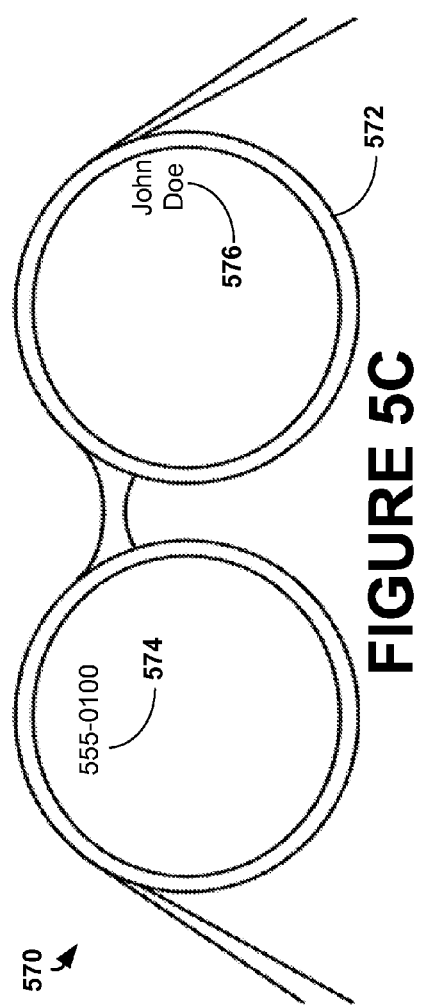
FIG. 5C is an embodiment of displaying phone images.

FIG. 5C is an embodiment of displaying phone images, or images associated with a phone. In an example embodiment, a display apparatus 570 may be coupled to a mobile device such as a cellular phone. Each display on a headset 572 may display different information about the mobile device. For example, a call indicator 574 may notify a user that the user is receiving a phone call from phone number 555-0100 and a caller ID indicator 576 may notify that the calling party is John Doe. In some embodiments, a user of the display apparatus 570 may customize what objects are shown, such as omitting either the call indicator 574 or the caller ID indicator 576, for example.

The information that may be provided to a user from the display apparatus 570 is not limited to the call indicator 574 or the caller ID indicator 576. For example, in some embodiments, the call indicator 574 or the caller ID indicator 576 may display contents of a text message (SMS) sent to the mobile device. The call indicator 574 or the caller ID indicator 576 may also display contents of a phone book associated with the mobile device, allowing a user to browse phone book contacts without looking at the screen of the mobile device. The display apparatus 570 may also be configured to display other information from a mobile device, such as calendar events or email, for example.

3. Example Embodiments of Display Methods

FIG. 6 is an example block diagram of a method to display images to a user, in accordance with at least some embodiments described herein. Method 600 shown in FIG. 6 presents an embodiment of a method that, for example, could be used with the apparatuses 100 and 150, the systems 200 and 250, the images 300 and 400, images 500, 550, and 570, apparatus 700, and/or apparatus 800. Method 600 may include one or more operations, functions, or actions as illustrated by one or more of blocks 602, 604, 606, and 608. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 600 may begin at block 602, "RECEIVE IMAGE DATA." In some examples of block 602, data is received corresponding to an image (e.g., an image file). The image data may comprise at least one object. In some embodiments, the data received may be a computer image file, such as a JPEG, GIF, PNG, or other image format. In other embodiments, the data may be a computer video file, such as MPG, MOV, AVI, or other video format. In further embodiments, the data may be data encoded in a way the system will be able to interpret the data as image data, such as data relating to objects from an image library or data relating to a three dimensional model. The data may also be OpenGL data for rendering, or plain text that could be rendered into objects or a processor could translate the text into objects.

A processor in a system may be configured to interpret the data and form an image. Additionally, the processor may be configured to identify at least one object within the image data. In some embodiments, an image file may be considered an object. In other embodiments, the processor may divide an image file or video file into multiple objects. In embodiments where a data stream is received, the processor may be configured to determine objects from the received data.

Block 602 may be followed by block 604, "ASSIGN IMAGE OBJECTS TO ONE OF TWO IMAGE SETS." In some examples of block 604, the objects are assigned to either a foreground image set or a background image set (the terms foreground and background are merely example classifications and may not imply a spatial relationship). Objects can be assigned to the foreground image set or the background image set based on a variety of criteria.

In one embodiment, the data received may be OpenGL data. The OpenGL may be rendered with a processor into a three dimensional scene. The rendered scene may include a clipping plane. The clipping plane can be considered a transition from foreground to background. The system, software programmer, or an end user may determine a position of the clipping plane. Objects in front of the clipping plane can be added to the foreground object set and objects farther than the clipping plane can be added to the background object set.

Additional embodiments may include graphic libraries to determine whether an object is a foreground object or background object. Each graphic in the library may have a tag assigning the graphic as either as a foreground or background object as may be chosen by a software developer, end user, or dynamically by the processing system. The graphic library may comprise different images along with a foreground or background tag. In additional embodiments, the graphic library may comprise video information and images, each having a foreground or background tag.

Block 604 may be followed by block 606, "RENDER A FIRST DISPLAY IMAGE BASED ON AT LEAST THE FIRST IMAGE SET." In some examples of block 606, the first display image is rendered based on at least the foreground image set. In some embodiments, the image is rendered based on the graphics library. The objects that are a part of the foreground image set are rendered in focus (or substantially in focus) as part of the first display image. A degree to which the image is rendered in focus may vary depending upon a user's viewpoint.

In one example, an image may be rendered in focus by rendering the image in 20/20 vision or substantially 20/20 vision, e.g., rendering an image in a manner such that a visual acuity or clearness of vision of the image is high. Object placement in the first display image may be determined by the processing system, a user, a programmer, or the graphic library. Some objects may have predefined locations within a display image. In additional embodiments, the image is rendered with a processor based on OpenGL data. The OpenGL data renders an in-focus image comprising foreground objects. In further embodiments, the objects may be plain text to be rendered. The plain text may be converted to a graphic object before being rendered in the first display image.

In some embodiments, the first display image may also contain objects assigned to the background image set. When objects assigned to the background image set are rendered in the first display image, it may be desirable to render the objects out of focus or blurry. A degree to which the objects are out of focus may vary from slight out of focus where the object is discernable to substantially out of focus where the object is no longer discernable. In one example, the background object may have blurred edges or other features rendered out of focus. In additional embodiments, after the first display image is rendered, holes may be provided in the image or formed in the image corresponding to the placement of background object in a second display image. The hole may be a rough cut-out area of the first display image, or may substantially represent the first display image, for example.

In further embodiments, the first display image is rendered with both foreground objects and background objects in focus or substantially in focus. For example, the system may render the background objects in focus to the first display image, blur the image with the graphics processor, and then render the foreground objects in focus to the same display image. The resulting first display image would have the foreground objects in focus and the background objects blurred. The rendering library/graphics processor could preserve the front-to-back ordering of the rendered objects using a z-buffer algorithm. In addition, or alternatively, foreground objects may be rendered first to the second display image, then blurred, and following, background objects may be rendered in focus and to produce a desired result for the second display image, for example.

Block 606 may be followed by block 608, "RENDER A SECOND DISPLAY IMAGE BASED ON AT LEAST THE SECOND IMAGE SET." In some examples of block 608, the second display image is rendered with a processor based on at least the background image set. In some embodiments, the image is rendered based on the graphics library. The objects that are a part of the background image set are rendered in-focus as part of the second display image. The system, a user, a programmer, or the graphic library may determine object placement in the second display image. Some objects may have predefined locations within a display image. In additional embodiments, the image is rendered based on OpenGL data. The OpenGL data renders an in-focus image comprising background objects. In further embodiments, the objects may be plain text to be rendered. The plain text may be converted to a graphic object before being rendered in the second display image.

In some embodiments, the second display image may also contain objects assigned to the foreground image set. When objects assigned to the foreground image set are rendered in the second display image, it may be desirable to render the objects out of focus or blurry as previously shown in FIG. 4. The foreground object may have blurred edges or other features rendered out of focus. In additional embodiments, after the second display image is rendered, holes may be provided in the image corresponding to the placement of foreground object in the first display image as previously shown in FIG. 3. The hole may be a rough cut out area of the first display image.

In further embodiments, the second display image is rendered with both background objects and foreground objects in focus or substantially in focus. For example, the system may render the foreground objects in focus to the second display image, then blur the image with the graphics processor, and then render the background objects in focus to the same display image. The resulting second display image would have the background objects in focus and the foreground objects blurred. The rendering library/graphics processor could preserve the front-to-back ordering of the rendered objects using the z-buffer algorithm that may be used in such circumstances. In addition, or alternatively, background objects may be rendered first to the first display image, blurred, then foreground objects may be rendered in focus and to produce a desired result for the first display image, for example.

4. Example Hardware for Display of Objects on Near Eye Displays

Figure 7:
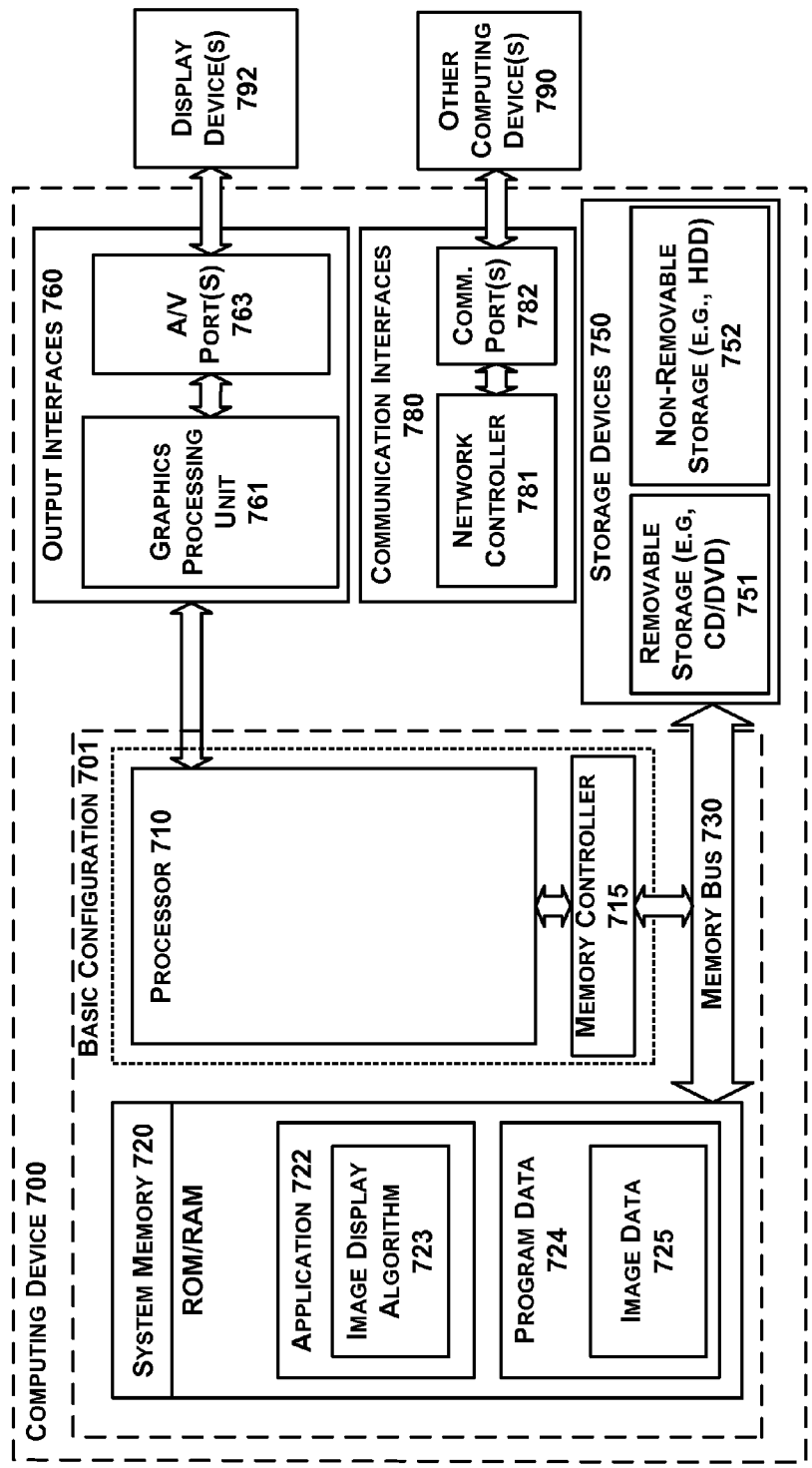
FIG. 7 is a functional block diagram illustrating an example computing device.

FIG. 7 is a functional block diagram illustrating an example computing device used in a computing system that is arranged in accordance with at least some embodiments described herein. The computing device may be a personal computer, mobile device, cellular phone, video game system, or global positioning system. In a very basic configuration 701, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes one or more applications 722, and program data 724. Application 722 may include an image display algorithm 723 that is arranged to provide inputs to the electronic circuits, in accordance with the present disclosure. Program Data 724 may include image data 725 that could provide image data to the electronic circuits. In some example embodiments, application 722 can be arranged to operate with program data 724 on an operating system 721. This described basic configuration is illustrated in FIG. 7 by those components within dashed line 701.

Computing device 700 can have additional features or functionality, and additional interfaces to facilitate communications between the basic configuration 701 and any devices and interfaces. For example, the data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 720, removable storage 751, and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 760 that may include a graphics processing unit 761, which can be configured to communicate to various external devices such as display devices 792 or speakers via one or more A/V ports 763 or a communication interface 780. A communication interface 780 may include a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 8:
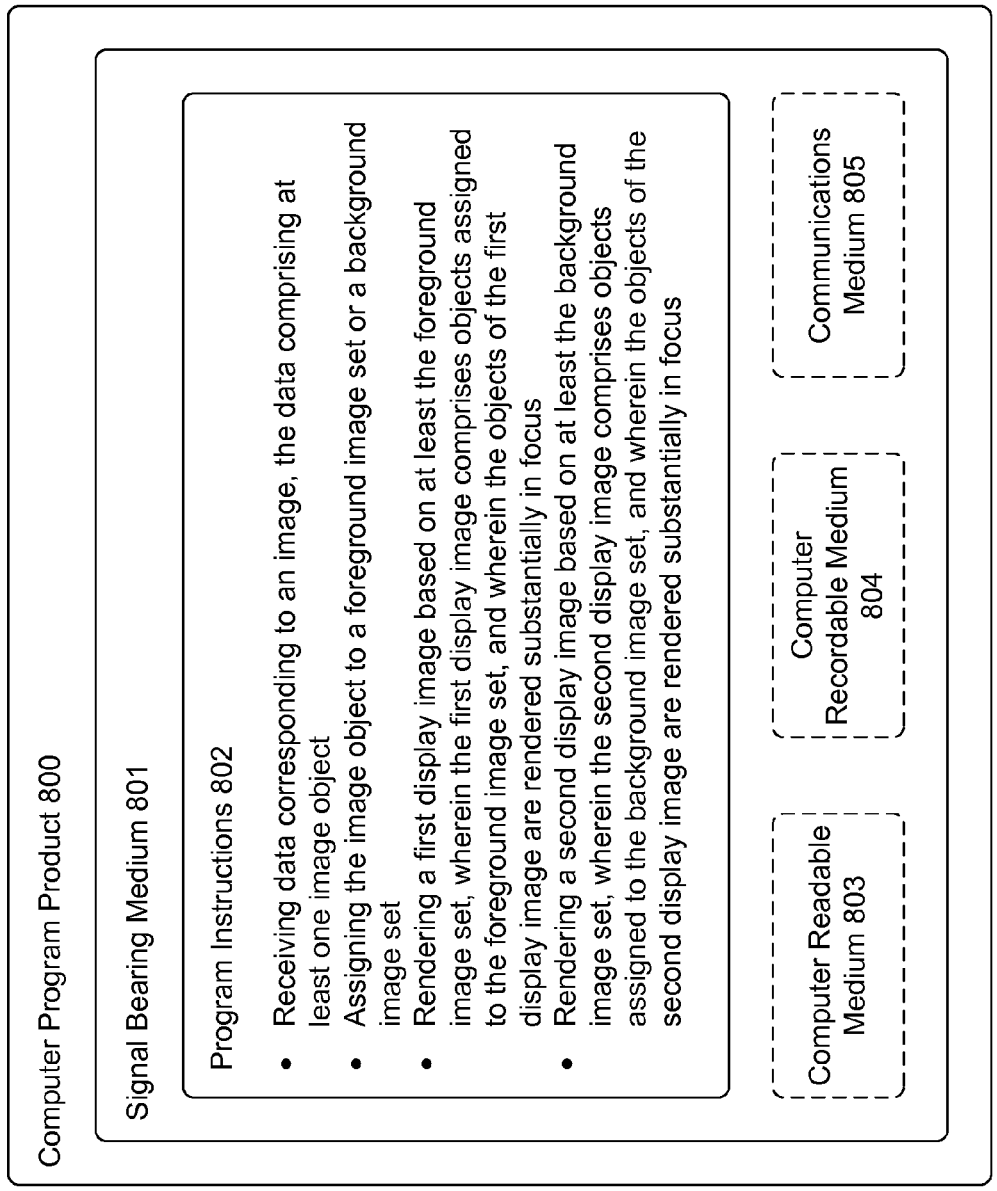
FIG. 8 is a schematic illustrating a conceptual partial view of an example computer program.

In some embodiments, the disclosed methods may be implemented as computer program instructions encoded on a computer-readable storage media in a machine-readable format. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-6. Thus, for example, referring the embodiment shown in FIG. 6, one or more features of blocks 602, 604, 606, and/or 608 may be undertaken by one or more instructions associated with the signal bearing medium 801.

In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for displaying images comprising:
   receiving data, with a processor, corresponding to an image, the data comprising at least one image object;
   assigning, with the processor, the image object to a first image set or a second image set;
   rendering, with the processor, a left eye display image based on at least the first image set, wherein the left eye display image comprises objects assigned to the first image set, and wherein the objects of the first image set are rendered to the left eye display image substantially in focus; and
   rendering, with the processor, a right eye display image based on at least the second image set, wherein the right eye display image comprises objects assigned to the second image set, and wherein the objects of the second image set are rendered to the right eye display image substantially in focus.

2. The method of claim 1, wherein the first image set is a foreground image set and the second image set is a background image set.

3. The method of claim 1, wherein the first image set is a background image set and the second image set is a foreground image set.

4. The method of claim 1, further comprising displaying the left eye display image on a left eye display and displaying the right eye display image on a right eye display.

5. The method of claim 1, wherein rendering the left eye display image comprises further rendering objects assigned to the second image set, and wherein objects assigned to the second image set are out of focus.

6. The method of claim 1, wherein rendering the right eye display image comprises further rendering objects assigned to the first image set, and wherein objects assigned to the first image set are out of focus.

7. The method of claim 1, wherein rendering the right eye display image comprises rendering the objects assigned to the second image set with at least one hole corresponding to the objects in the left eye display image.

8. The method of claim 1, wherein rendering the left eye display image comprises rendering the objects assigned to the first image set with at least one hole corresponding to the objects in the right eye display image.

9. An apparatus for displaying images comprising:
   means for receiving data corresponding to an image, the data comprising at least one image object;
   means for assigning the image object to either a first image set or a second image set;
   means for rendering a left eye display image based on at least the first image set, wherein the left eye display image comprises objects assigned to the first image set, and wherein the objects of the first image set are rendered to the left eye display image substantially in focus; and
   means for rendering a right eye display image based on at least the second image set, wherein the right eye display image comprises objects assigned to the second image set, and wherein the objects of the second image set are rendered to the right eye display image substantially in focus.

10. The apparatus of claim 9, further comprising a first means for displaying the left eye display image and a second means for displaying the right eye display image.

11. The apparatus of claim 9, wherein means for rendering the left eye display image comprises further means for rendering objects assigned to the second image set, and wherein objects assigned to the second image set are out of focus.

12. The apparatus of claim 9, wherein means for rendering the right eye display image comprises further means for rendering objects assigned to the first image set, and wherein objects assigned to the first image set are out of focus.

13. An article of manufacture including a tangible non-transitory computer-readable media having computer-readable instructions encoded thereon, the instructions comprising:
   instructions for receiving data corresponding to an image, the data comprising at least one image object;
   instructions for assigning the image object to either a first image set or a second image set;
   instructions for rendering a left eye display image based on at least the first image set, wherein the left eye display image comprises objects assigned to the first image set, and wherein the objects of the first image set are rendered to the left eye display image substantially in focus; and instructions for rendering a right eye display image based on at least the second image set, wherein the right eye display image comprises objects assigned to the second image set, and wherein the objects of the second image set are rendered to the right eye display image substantially in focus.

14. The article of manufacture of claim 13, wherein the first image set is a foreground image set and the second image set is a background image set.

15. The article of manufacture of claim 13, wherein the first image set is a background image set and the second image set is a foreground image set.

16. The article of manufacture of claim 13, further comprising instructions for displaying the left eye display image on a left eye display and displaying the right eye display image on a right eye display.

17. The article of manufacture of claim 13, wherein instructions for rendering the left eye display image comprises further instructions for rendering objects assigned to the second image set, and wherein objects assigned to the second image set are out of focus.

18. The article of manufacture of claim 13, wherein instructions for rendering the right eye display image comprises further instructions for rendering objects assigned to the first image set, and wherein objects assigned to the first image set are out of focus.

19. The article of manufacture of claim 13, wherein instructions for rendering the right eye display image comprises instructions for rendering the objects assigned to the second image set with at least one hole corresponding to the objects in the left eye display image.

20. The article of manufacture of claim 13, wherein instructions for rendering the left eye display image comprises instructions for rendering the objects assigned to the first image set with at least one hole corresponding to the objects in the right eye display image.

* * * * *